April 10, 1945. E. M. MOREHOUSE 2,373,328
WRAP-AROUND WIRE SUPPORTING CLIP
Filed June 7, 1943

Inventor
Eugene M. Morehouse.
By R. S. Berry
Attorney

Patented Apr. 10, 1945

2,373,328

UNITED STATES PATENT OFFICE 2,373,328

WRAP-AROUND WIRE SUPPORTING CLIP

Eugene M. Morehouse, Tujunga, Calif., assignor to Adel Precision Products Corp., a corporation of California Application June 7, 1943, Serial No. 490,120

7 Claims. (Cl. 248—61)

This invention relates to a clip or like device for supporting an electrical conductor wire or a group thereof in an aircraft and has for its primary object the provision of a device of this character in the form of a flexible strap constructed and arranged so that it may be quickly and easily manipulated to embrace a wire or group of wires, then as readily wrapped around and securely fastened to a conduit line or other suitable supporting member.

In present day aircraft many of the electrical wires are extended throughout the plane in the direction of or adjacent numerous conduit lines installed in the aircraft and it is an important object of this invention to provide a wire supporting strap such as described which may be quickly and easily looped around a wire or group of wires and as easily detachably mounted on a conveniently located conduit, said strip being made of flexible and yieldable material so that it affords a vibration absorbing and cushioning seat for the wires and cushions the wires against the conduit, thereby preventing chafing and wear of the wires and conduit.

Another object is to provide a wire supporting strap of the character described which is readily applicable to wires or groups of wires of different diameters and likewise applicable to conduits and like supports of various diameters in that the strap is elastic and may be stretched to effect a tensioned gripping of the wires as well as a tensioned engagement with the conduit or support to which it is secured.

A further object of my invention is to provide a wire support of the character described which is considerably lighter as to weight, more compact, cheaper to manufacture, and capable of being much more readily and easily installed and removed than wire clips heretofore used.

Yet another object of my invention is to provide a wire clip such as described wherein a novel fastening means therefor makes it possible to effect a quick, secure installation thereof under tension and cushioned against the wires and conduit in a particularly efficacious manner with a strap of one size applicable to wires and conduits over a wide range of diameters.

A further object of this invention is to provide a wire clip such as described which makes it possible to make sub-assemblies of wires and conduits before installation in the aircraft, with the wires securely held on the conduit and the clip requiring no further operation or manipulation after the sub-assembly unit is installed.

A more specific object of the invention is to provide a conduit supporting strap having a portion intermediate its ends which is cut in such a manner as to permit of another portion of the strap being fed therethrough, without the cut portion of the strap being in any degree weakened in regard to its capacity for resisting longitudinal strain.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

As shown in the accompanying drawing, one embodiment of my invention includes a ribbon-like strap 1 formed of flexible, yieldable and elastic material such as rubber, synthetic rubber, or the like, and provided approximately centrally of its ends with a narrow longitudinal slit 2 the ends of which are somewhat enlarged and rounded as at 3 to prevent tearing of the material.

At one end of the strap a female snap fastener 4 is fixed while at the other end a series of male snap fasteners 5 are spaced apart longitudinally of the strap.

Figures 1, 2:
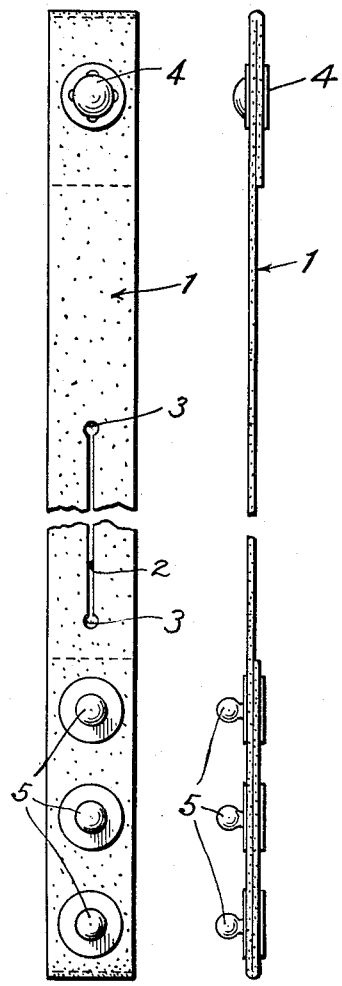
Fig. 1 is a fragmentary front elevation of a wire supporting clip embodying my invention.
Fig. 2 is a fragmentary edge elevation of the clip shown in Fig. 1.
Figure 3:
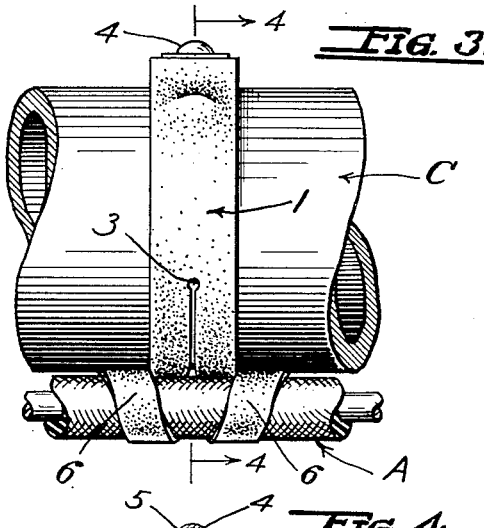
Fig. 3 is a fragmentary side elevation of the clip as installed.
Figure 4:
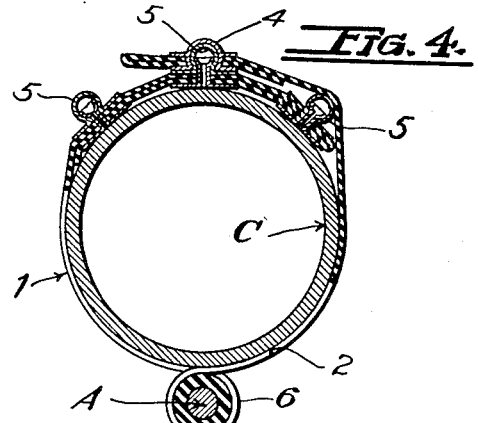
Fig. 4 is a cross sectional view taken on the line 4—4 of Fig. 3.
Figure 5:
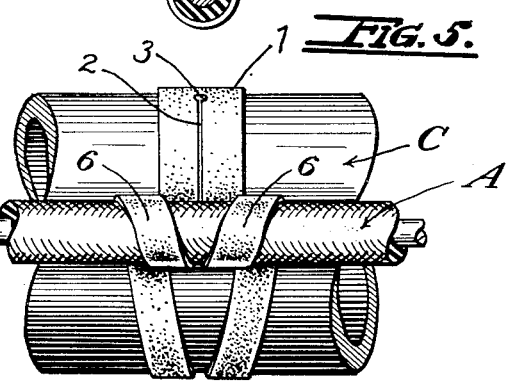
Fig. 5 is a fragmentary bottom plan view of the installation shown in Figs. 3 and 4.
Figure 6:
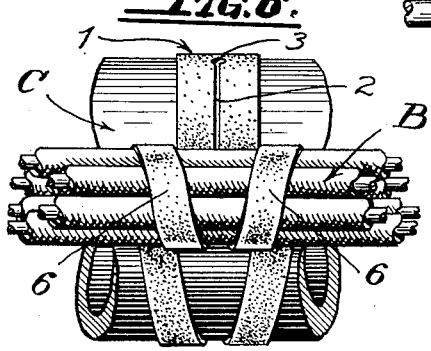
Fig. 6 is a bottom plan view corresponding to Fig. 5 with a group of wires supported in the clip.

In the use of the strap, it is wrapped partly around a wire A as shown in Figs. 3, 4 and 5 or a group of wires B as shown in Fig. 6 and one end of the strap is then inserted through the slit to form a pair of spaced wire-embracing loops 6 between the ends of the strap, said loops gripping the wire at longitudinally spaced points thereon. The end portions of the strap are wrapped around a conduit C or like supporting member and pulled tightly to place the loops 6 and the portions embracing the conduit under tension following which the ends are overlapped and snapped together as shown in Fig. 4 by means of the snap fastenings 4 and 5. The several longitudinally spaced male fasteners 5 make it possible to apply the strap to wires or groups of wires of varying diameters as well as to conduits of different diameters with provisions for securely fastening the strap in place and under tension.

If the supporting conduit or member is of small diameter, the strap may be wrapped around it twice or more, then fastened as aforesaid. If the conduit has a large diameter the strap may be stretched sufficiently to fasten it in place thereon.

It is now seen that the strap of this invention makes it possible to quickly and easily secure a wire or group of wires to a conduit or the like with the wires securely held in a cushioned, vibration-absorbing seat and protected against chafing and wear, the conduit being likewise protected against chafing and wear, the conduit being likewise protected as several cushioning portions of the strap lie between it and the wire. As this form of clip is primarily made of non-metallic material, it is lighter, less expensive and takes up less room than clips heretofore used.

It will also be observed that the provision of the slit 2 does not lessen the capacity of the strap for resisting longitudinal strain, and that the slit portion of the strap is substantially as resistant to longitudinal traction as are the portions of the strap adjacent to it.

Moreover, this form of clip makes it possible to carry out sub-assembly operations wherein wires are clipped on pipes preliminary to installation in the aircraft.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting wires, a flexible strap of substantially uniform width throughout its length and having a slit extending longitudinally thereof between its ends and in such a manner as to leave intact the longitudinal tenacity of the strap, and which when an end of the strap is inserted through the slit will define a pair of wire embracing loops, and means for fastening the ends of the strap together after the strap is wrapped around a support.

2. In a clip for supporting wires, a flexible strap having a slit extending longitudinally thereof between its ends and which when an end of the strap is inserted through the slit will define a pair of wire embracing loops, and means for fastening the ends of the strap together after the strap is wrapped around a support, said strap being formed of yieldable, elastic material and being placed under tension when fastened on said support, the strength of the strap under longitudinal tension being unaffected by the slitting thereof.

3. In a clip for supporting a wire or a group of wires, a strap formed of elastic, yieldable material having a longitudinal slit intermediate its ends which when the strap is manipulated to embrace a wire or group of wires and one end thereof is inserted through the slit will define a pair of wire embracing loops for holding said wire or group of wires with the remaining portions of the strap subject to manipulation to embrace a conduit or other support, the slitted part of the strap being undiminished in longitudinal strength, and means for detachably fastening the ends of the strap together with the strap under tension throughout its length and embracing the conduit or other support.

4. In a clip for supporting a wire or a group of wires, a strap formed of elastic, yieldable material having a longitudinal slit intermediate its ends which when the strap is manipulated to embrace a wire or group of wires and one end thereof is inserted through the slit will define a pair of wire embracing loops for holding said wire or group of wires with the remaining portions of the strap subject to manipulation to embrace a conduit or other support, the slitted part of the strap being undiminished in longitudinal strength, and means for detachably fastening the ends of the strap together with the strap under tension throughout its length and embracing the conduit or other support, portions of the strap lying between the conduit and the wires to prevent chafing and wear of the conduit and the wires.

5. In a clip for supporting a wire or a group of wires, a strap formed of elastic, yieldable material having a longitudinal slit intermediate its ends which when the strap is manipulated to embrace a wire or group of wires and one end thereof is inserted through the slit will define a pair of wire embracing loops for holding said wire or group of wires with the remaining portions of the strap subject to manipulation to embrace a conduit or other support, the slitted part of the strap being undiminished in longitudinal strength, and means for detachably fastening the ends of the strap together with the strap under tension throughout its length and embracing the conduit or other support, said loops being spaced apart and embracing the wires at points longitudinally spaced thereon.

6. In a clip for supporting wires, a flexible strap having a slit extending longitudinally thereof between its ends and in such a manner as to leave intact the longitudinal tenacity of the strap, and which when an end of the strap is inserted through the slit will define a pair of wire embracing loops, and means for fastening the ends of the strap together after the strap is wrapped around a support, said strap having unslitted end portions of considerable length and at least equal in outside width to the width of the slitted portion thereof.

7. In a clip for supporting a wire or a group of wires a strap formed of elastic, yieldable material having a longitudinal slit intermediate its ends which when the strap is manipulated to embrace a wire or group of wires and one end thereof is inserted through the slit will define a pair of wire embracing loops for holding said wire or group of wires with the remaining portions of the strap subject to manipulation to embrace a conduit or other support, the slitted part of the strap being undiminished in longitudinal strength, and means for detachably fastening the ends of the strap together with the strap under tension throughout its length and embracing the conduit or other support, said loops being spaced apart and embracing the wires at points longitudinally spaced thereon, said strap having unslitted end portions of considerable length and at least equal in outside width to the width of the slitted portion thereof.

EUGENE M. MOREHOUSE.